Patented Nov. 23, 1937

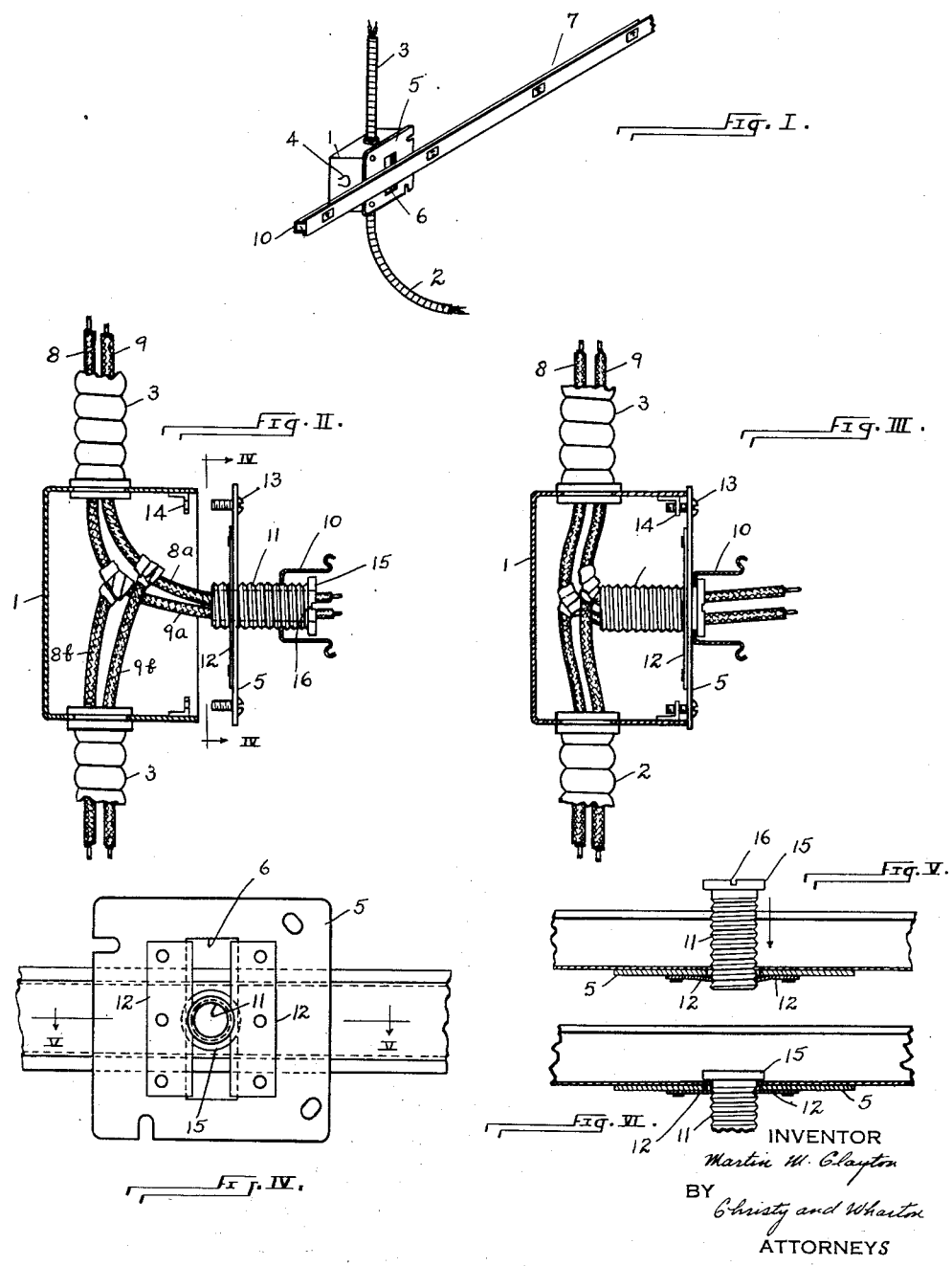

2,100,100

UNITED STATES PATENT OFFICE 2,100,100

ELECTRICAL DUCT FEED

Martin M. Clayton, Baden, Pa., assignor to National Electric Products Corporation, a corporation of Delaware Application May 22, 1936, Serial No. 81,204

5 Claims. (Cl. 247—3)

This invention relates to an electrical feed connection with an outlet or junction box, and is of particular importance in the feeding of the elongate electrical receptacles known as multiple outlet ducts, or plug-in strips.

It should be explained that, while multiple outlet duct or plug-in strip may be mounted in various positions in a building structure, as, for example, in a baseboard or chair rail, it is always installed after the walls of a building have been sealed in. When walls in which multiple outlet duct is mounted are of the hollow type, no substantial difficulty is encountered in making electrical feed connection. This is for the reason that, before the walls are sealed in, cable may be run through the walls and left with a substantial length projecting from the skin of the wall. When feed connection is then made to a multiple outlet duct, surplus cable may be pushed back into the hollow interior of the wall. When, however, a solid wall construction is employed, electrical take-off means are built into the wall structure, and provide no tolerance for the making of specialized electrical connection thereto. Particularly in instances in which multiple outlet duct is to be installed in a previously finished building in which the electrical arrangements are fixed and limited, difficulty is experienced in making appropriate feed connection to multiple outlet duct.

Under the conditions most favorable for a multiple outlet duct installation, that is, in a building structure utilizing walls of the hollow type, the electrician is limited to flexible cable of some sort as a container for conductors, in order to provide sufficient flexibility in connection for feeding multiple outlet duct. Since it is frequently desired to house conductors in rigid conduit connected with outlet boxes, the installation of multiple outlet duct thus imposes undesirable restriction upon the electrical wiring system of the building.

With these problems chiefly in mind, I have invented an outlet box and cooperative connector by means of which feed connection may suitably be made between an elongate multiple outlet duct and an outlet, or junction, box embedded in the wall of a building. Also, I have provided an outlet box and multiple outlet duct connection of such sort that the outlet box may be wired during construction of the wall in which it is installed to lead off a plurality of enclosed circuits in addition to the circuit utilized electrically to feed the multiple outlet duct, thus serving as a junction box as well as a simple outlet. For this reason, as well as for the reason that the choice of housings for an outlet duct circuit is greatly increased by use of my connection, my outlet box and connector assembly desirably is utilized even though a hollow wall construction adapted to the making of feed connection to multiple outlet duct is present. That is, under such circumstances involving no inherent difficulty in making feed connection to a multiple outlet duct, my connector assembly none the less serves substantially to reduce wiring complexity in a building in which multiple outlet duct is installed.

In the drawing Fig. I is an isometric view of an assembly of outlet box and multiple outlet duct, showing the outlet box arranged for the making of feed connection to the multiple outlet duct, and illustrating the position of the outlet box and multiple outlet duct as these elements are arranged in making feed connection to the duct.

Fig. II is a cross-sectional view through an outlet box and the trough or channel element of a multiple outlet duct, showing my connector assembly, and illustrating the making of feed connection from the outlet box to the duct.

Fig. III is a view similar to Fig. II, but showing the position of the elements when the feed connection has been made, and illustrating specifically the fully assembled position of the connector elements.

Fig. IV is an elevation of the outlet box cover and the trough element of a multiple outlet duct, illustrating the elements of my connector assembly in cooperative relation, the structure being viewed from the plane of the line IV—IV of Fig. II.

Fig. V is a fragmentary illustrative view, illustrating a stage in the making of electrical connection between a multiple outlet duct and an outlet box by means of my connector assembly, this figure of the drawing corresponding in detail to the more general showing of Fig. II.

Fig. VI is a similar illustrative view, showing the relative position of the parts when feed connection from the outlet box to the multiple outlet duct has completely been made, this figure of the drawing thus corresponding in detail to the more general showing of Fig. III.

Referring particularly to Fig. I of the drawing, reference numeral 1 designates an outlet or junction box, which is shown as having armored cables 2 and 3 leading thereto and therefrom. The side walls of the outlet box have therein knock-outs 4, and the cover 5 of the outlet box has therein an elongate opening 6, which is vertically disposed as the outlet box is mounted. A length of multiple outlet duct, or plug-in strip, designated generally by reference numeral 7, is shown in a position of connected adjacency to the outlet box 1.

Assuming that the outlet box is enclosed in a wall of solid construction, it will be clear that problems are involved in making electrical connection between the plug-in strip and the outlet box. Thus the plug-in strip cannot itself be rotated to any appreciable number of degrees properly to make connection to the outlet box, since it invariably has a mounting in a definite position of parallelism to some structural element, such as a mounting in a baseboard, or in the skin of the wall body, parallel to a floor or ceiling. Also, the narrow width of the outlet duct does not provide space selectively to project a connector along a vertical line to find a restricted opening through the outlet box cover. These problems in making feed connection to the plug-in strip are solved by my feed connection.

Referring now to Figs. II and III of the drawing, it will be seen that the conductors 8 and 9 housed in the cable 2 are spliced within the box 1, one pair of branch wires 8a and 9a serving to feed the multiple outlet duct, and the other branch conductors 8b and 9b being led off from the box by way of cable 3 for connection in some other locality. As shown in Fig. II, the channel element of the multiple outlet duct, therein specifically designated by reference numeral 10, has passed through its base a tubular connector 11, through which the conductors 8a and 9a are led. Connector 11 is shown as partially extended through elongate opening 6 in the cover 5 of the outlet box.

Referring now generally to Figs. II through VI of the drawing, illustrating the specific structure of the elements, it will be seen that plates 12, which desirably are of resilient and relatively hard steel, are attached to the inner face of the cover at opposite sides of the elongate opening 6 therein, marginally to obstruct the opening. The connector element 11 is exteriorly threaded, and the extreme diameter of the connector is greater than the unobstructed opening width lying between spring plates 12. In assembly, as shown in Fig. II, the connector is forced through the cover of the outlet box by distortion of the spring plates guarding the cover opening. This initial insertion of the connector desirably is effected by a straight push rather than by rotation of the connector. Upon substantial projection of the connector through the cover of the outlet box, the cover is attached to the box in usual manner as by cooperatively threaded screws 13 and lugs 14.

It should be understood that in completing the connection, the channel element 10 of the multiple outlet duct housing may in mounted position have its base directly abutting the outer face of the outlet box cover, as shown in Figs. II and VI of the drawing, or may be spaced from the outlet box cover by an intervening thickness of material against which the multiple outlet duct is mounted. In either case, the channel 10 of the multiple outlet duct is brought solidly to rest against its underlying surface. The flange, or head, 15 of the connector desirably is kerfed, as shown at 16, so that a screw driver, or other suitable tool, may be engaged with the connector so to turn it through the last portion of its travel that the connector head is brought into direct contact with the base of the channel element 10.

With the assembly completed, as shown in Fig. III, outlet box 1 not only provides feed connection to the multiple outlet duct, but also serves as a junction box from which a plurality of branch circuits are led off. While only one branch circuit, represented by the conductors 8b and 9b, is shown, it is to be understood that my feed connection to the multiple outlet duct is such as to permit the eduction of any such number of branch circuits as the form and arrangement of the box normally would permit.

Returning to a consideration of the connector assembly structure, the elongate form of opening 6 in the outlet box cover permits feed connection to the multiple outlet duct to be made in any position throughout the length of the opening. It is unnecessary, therefore, that the mounted position of the multiple outlet duct respond vertically to an exact positioning, in order that feed connection with the outlet box may be made. As shown, the connector is inserted at the median line of the cover opening. It may, however, be pushed into position either above or below the position shown in accommodation to varying heights of multiple outlet duct mounting within the vertical bounds of the cover opening. As pushed past the engaging plates 12, the connector 11 is held firmly in the exact position in the cover opening in which it has been inserted, and when fully pushed in and turned down it is locked in that position. In order that the connector should not tend to slip downwardly in the opening of the outlet box cover, it is desirable that the spring plates 12 be of such gauge and material that they present substantial resistance to distortion, and firmly hold the connector in any position vertically along the cover opening.

The feed connection for multiple outlet duct provided by my assembly obviates a disadvantage which apparently was implicitly involved in the form and nature of multiple outlet duct. Such apparently implicit disadvantage arose from the apparent necessity of making an individual cable connection electrically to feed each length of duct. By providing selectivity both in the vertical positioning of the multiple outlet duct and in its lateral spacing from a fixed source of current supply, my feed connection solves this difficulty. Thus, a substantial tolerance in vertical positioning of the multiple outlet duct is provided by the length of cover opening 6, at any point along which the cover may be inserted; similarly, the length of the conductor element itself provides substantial tolerance permitting the making of feed connection to the outlet box while spacing the base of the channel element of the multiple outlet duct structure any distance from the cover of the outlet box which lies within the effective length of the tubular connector element. As explained above, in making feed connection for a multiple outlet duct to a wiring system housed in a solid wall, my duct feed connection overcomes an inherent difficulty of the most serious nature.

Obviously my connector may be utilized in feeding fixtures of a sort other than multiple outlet duct from an outlet, or junction, box. For various such fixtures the selectivity in the position of the feed connection is of substantial advantage. In connection with a multiple outlet duct, however, my feed connection appears as the sole satisfactory expedient in making between a multiple outlet duct and an outlet box a direct physical connection providing feed connection from the outlet box to the duct.

It is to be understood that, as herein used, the designation "outlet box" is to be construed generally rather than technically. Thus any structural element of a wiring system defining a space at which connection to the system conductors may be made, or from which conductors may be brought out, is to be considered for the purpose of defining my invention as being an outlet box.

I claim as my invention:

1. In combination with an elongate multiple outlet duct an outlet box having in a wall thereof an elongate opening for the reception of a take-off connector, connector-engaging means associated in the outlet box along the connector-receiving opening therein, and a hollow take-off connector adapted for projection through a wall of the multiple outlet duct for leading conductors thereinto and for entry through the wall opening of the outlet box, said hollow connector having exteriorly thereof means cooperative with the connector-engaging means of the outlet box adapted in various adjusted positions of the connector along the wall opening of the outlet box selectively to engage the connector and the multiple outlet duct in one dimension limited by the length of the outlet box wall opening.

2. In combination with an elongate multiple outlet duct an outlet box having in a wall thereof an elongate opening for the reception of a take-off connector and connector-engaging means arranged along said opening, and a hollow take-off connector adapted for projection through a wall of the multiple outlet duct to lead conductors thereinto and for entry through the wall opening of the outlet box for projection into the outlet box interior, said hollow connector being exteriorly formed for cooperative engagement with the connector-engaging means of the outlet box in various selective positions of projection into the outlet box and in various selective positions along the wall opening of the outlet box; thereby to make feed connection to the multiple outlet duct in selective positioning of the multiple outlet in one dimension limited by the length of the opening in the outlet box wall and in another dimension limited by the effective length of the connector.

3. In combination with an elongate multiple outlet duct an outlet box having in a wall thereof an elongate aperture for the reception of a take-off connector, resilient connector-engaging means arranged along the said outlet box aperture by distortion thereof to engage a connector body projected through the wall opening of the outlet box into the outlet box interior, and a hollow take-off connector adapted for projection through a wall of the multiple outlet duct to lead conductors thereinto and for entry through the wall opening of the outlet box for projection into the outlet box interior, said hollow connector being exteriorly formed for cooperative engagement with the connector-engaging means of the outlet box in various selective positions of projection into the outlet box and in various selective positions along the wall opening of the outlet box; thereby to make feed connection to the multiple outlet duct in selective positioning of the multiple outlet duct in one dimension limited by the length of the opening in the outlet box wall and in another dimension limited by the effective length of the connector.

4. In combination with an electrical fixture an outlet box having in a wall thereof an elongate opening for the reception of a take-off connector and resilient connector-engaging means arranged along the said outlet box opening by distortion thereof to engage a connector body entered through the wall opening of the outlet box into the outlet box interior, and a hollow take-off connector adapted for projection from a fixture to lead conductors thereinto and for entry through the outlet box wall for projection into the outlet box interior, said hollow connector being exteriorly formed for cooperative engagement with the resilient connector-engaging means of the outlet box in various positions of projection into the outlet box and in various positions along the wall opening of the outlet box; thereby to make feed connection to a fixture in selective positioning of the fixture in one dimension limited by the length of the opening in the outlet box wall and in another dimension limited by the effective length of the connector.

5. In combination with an electrical fixture an outlet box having in a wall thereof an elongate opening for reception of a take-off connector and connector-engaging means arranged along said opening, and a hollow take-off connector adapted for projection from a fixture to lead conductors thereinto and for entry through the outlet box wall for projection into the outlet box interior, said hollow connector being exteriorly formed for cooperative engagement with the connector-engaging means of the outlet box in various positions of projection into the outlet box and in various positions along the wall opening of the outlet box; thereby to make feed connection to a fixture in selective positioning of the fixture in one dimension limited by the length of the opening in the outlet box wall and in another dimension limited by the effective length of the connector.

MARTIN M. CLAYTON.